US012737643B2

(12) United States Patent
Baughman et al.

(10) Patent No.: US 12,737,643 B2
(45) Date of Patent: Sep. 15, 2026

(54) ARTIFICIAL INTELLIGENCE TRUSTWORTHINESS

(71) Applicant: INTERNATIONAL BUSINESS MACHINES CORPORATION, Armonk, NY (US)

(72) Inventors: Aaron K. Baughman, Cary, NC (US); Jeremy R. Fox, Georgetown, TX (US); Zachary A. Silverstein, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 17/931,479

(22) Filed: Sep. 12, 2022

(65) Prior Publication Data

US 2024/0086729 A1 Mar. 14, 2024

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS 11,108,557 B2 8/2021 Ray
11,257,574 B1 * 2/2022 Boussios ................ G16H 10/60
11,651,216 B2 * 5/2023 Dalli ...................... G06N 3/082
706/15
2016/0182666 A1 6/2016 Rathod
(Continued)

FOREIGN PATENT DOCUMENTS

WO WO-2023011728 A1 * 2/2023 ............ H04L 63/20

OTHER PUBLICATIONS

Hafizoğlu, et al., "Understanding the Influences of Past Experience on Trust in Human-agent Teamwork", ACM Transactions on Internet Technology, vol. 19, Issue 4, Nov. 2019, Article No. 45, 22 pgs., <https://doi.org/10.1145/3324300>.
(Continued)

*Primary Examiner* — William L Bashore
*Assistant Examiner* — Koorosh Nehchiri
(74) *Attorney, Agent, or Firm* — Eric W. Chesley

(57) ABSTRACT

Described are techniques for a trustworthy artificial intelligence (AI) service. The techniques include identifying a user experience (UX) component in a front-end UX containing information that conveys a trustworthy AI factor. The techniques further include evaluating the information contained in the UX component to determine a trust score for the UX component that indicates a degree to which the information contained in the UX component conveys the trustworthy AI factor. The techniques further include determining, based on the trust score for the UX component, that the information contained in the UX component does not meet a threshold of disclosure of the trustworthy AI factor. The techniques further include obtaining an alternative UX component containing additional information that meets the threshold of disclosure of the trustworthy AI factor and providing the alternative UX component for incorporation into the front-end UX of the application.

20 Claims, 12 Drawing Sheets

(56) References Cited

U.S. PATENT DOCUMENTS

| | | | | |
|---|---|---|---|---|
| 2018/0357552 | A1 * | 12/2018 | Campos | G06N 3/0499 |
| 2019/0220583 | A1 | 7/2019 | Douglas | |
| 2021/0174562 | A1 * | 6/2021 | Kursun | G06N 3/084 |
| 2021/0232940 | A1 * | 7/2021 | Dalli | G06N 3/042 |
| 2021/0303867 | A1 * | 9/2021 | Vaughan | G06V 10/25 |
| 2022/0114417 | A1 | 4/2022 | Dalli | |
| 2022/0385645 | A1 * | 12/2022 | Murdoch | H04L 9/30 |
| 2023/0040284 | A1 * | 2/2023 | Ali-Tolppa | H04L 63/126 |
| 2023/0114826 | A1 * | 4/2023 | Donovan | G06N 20/00 706/11 |
| 2023/0229940 | A1 * | 7/2023 | Reineke | G06N 5/025 706/47 |
| 2023/0231883 | A1 * | 7/2023 | Reineke | G06F 9/505 726/1 |
| 2024/0195701 | A1 * | 6/2024 | Subramanya | H04L 41/145 |

OTHER PUBLICATIONS

"IBM Compilers", IBM, IT Infrastructure, IBM Z, Products, Downloaded from the Internet on Jun. 10, 2022, 12 pgs., <https://www.ibm.com/products/ibm-compilers>.

"MLOps and Trustworthy AI", IBM Cloud Pak for Data, 9 pgs., Downloaded from the Internet on Jun. 10, 2022, <https://www.ibm.com/watson/trustworthy-ai>.

"Trusted AI", AI, IBM, Downloaded from the Internet on Jun. 10, 2022, 14 pgs., <https://research.ibm.com/teams/trusted-ai>.

"IBM Rational Test", IBM Cloud, Downloaded from the Internet on Jun. 10, 2022, 7 pgs., <https://www.ibm.com/cloud/devops/software-testing>.

LaRosa, et al., "Impacts on Trust of Healthcare AI", AIES '18: Proceedings of the 2018 AAAI/ACM Conference on AI, Ethics, and Society, Dec. 2018, 7 pgs., <https://doi.org/10.1145/3278721.3278771>.

Lia, et al., "Questioning the AI: Informing Design Practices for Explainable AI User Experiences", CHI '20: Proceedings of the 2020 CHI Conference on Human Factors in Computing Systems, Apr. 2020, 16 pgs., <https://doi.org/10.1145/3313831.3376590>.

Min, et al., "Research on Users' Trust of Chatbots Driven by AI: An Empirical Analysis Based on System Factors and User Characteristics", 2021 IEEE International Conference on Consumer Electronics and Computer Engineering (ICCECE 2021), 2021, 4 pgs.

Ramer, A., "Computational Quantification of Trust Updates," 2006 International Workshop on Integrating AI and Data Mining, 2006, 6 pgs., doi: 10.1109/AIDM.2006.3.

Tejwani, et al., "Migratable AI: Effect of Identity and Information Migration on Users' Perception of Conversational AI Agents", 2020 29th IEEE International Conference on Robot and Human Interactive Communication (RO-MAN), 2020, 8 pgs., doi: 10.1109/RO-MAN47096.2020.9223436.

Varhney, K., "On Mismatched Detection and Safe, Trustworthy Machine Learning," 2020 54th Annual Conference on Information Sciences and Systems (CISS), IEEE, May 2020. 4 pgs., doi: 10.1109/CISS48834.2020.1570627767.

* cited by examiner

Figure 5:
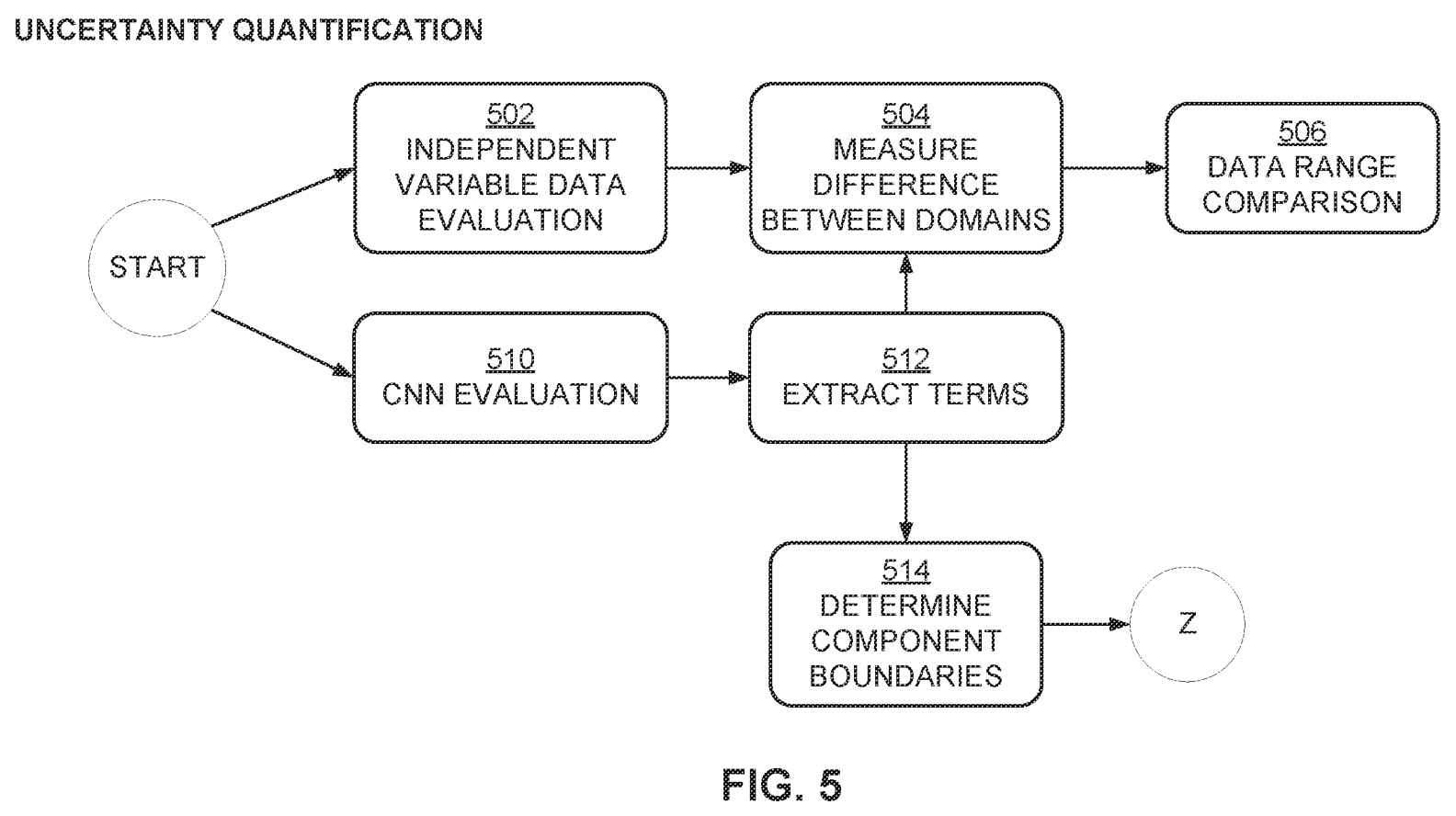

UNCERTAINTY QUANTIFICATION

START

502 INDEPENDENT VARIABLE DATA EVALUATION

510 CNN EVALUATION

504 MEASURE DIFFERENCE BETWEEN DOMAINS

512 EXTRACT TERMS

514 DETERMINE COMPONENT BOUNDARIES

506 DATA RANGE COMPARISON

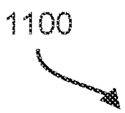

1102
Identify a UX component in a front-end UX of an application that contains information for a trustworthy AI factor 1104
Evaluate the information contained in the UX component to determine a trust score for the UX component that indicates a degree to which the information contained in the UX component conveys the trustworthy AI factor 1106
Determine based on the trust score for the UX component that the information contained in the UX component does not meet a threshold of disclosure of the trustworthy AI factor 1108
Obtain an alternative UX component containing additional information that meets the threshold of disclosure of the trustworthy AI factor 1110
Provide the alternative UX component for incorporation into the front-end UX of the application

FIG. 11

ARTIFICIAL INTELLIGENCE TRUSTWORTHINESS

BACKGROUND

The present disclosure relates to trustworthy artificial intelligence (AI), and, more specifically, to improving disclosure of trustworthy AI factors in a front-end user experience (UX).

AI is increasingly a business imperative. As AI tools propagate across nearly every industry and sector, it is imperative that users trust the output of the AI tools. Bias and discrimination, reputation damage and regulatory consequences, novel solutions delivering poor results that impact the bottom line are just some of the consequences that can emerge from AI that falls short of ethical design, development, deployment, and use. Trustworthy AI is a term used to describe AI that is lawful, ethically adherent, and technically robust. It is based on the concept that AI will reach its full potential when trust can be established in each stage of its lifecycle, from design to development, deployment and use. AI systems can be evaluated to determine system trustworthiness through measurements of trustworthy AI factors that include accuracy, reliability, explainability, fairness, and other AI system characteristics. The results of these evaluations can be provided to the users who rely on the AI systems.

SUMMARY

Aspects of the present disclosure are directed toward a computer-implemented method comprising identifying a UX component containing information that conveys a trustworthy AI factor, where the UX component is part of a front-end UX of an application that utilizes the AI model, and the information is related to an output of the AI model, and the trustworthy AI factor measures an aspect of trust in the output of the AI model. The method further comprises evaluating the information contained in the UX component to determine a trust score for the UX component that indicates a degree to which the information contained in the UX component conveys the trustworthy AI factor. The method further comprises determining, based on the trust score for the UX component, that the information contained in the UX component does not meet a threshold of disclosure of the trustworthy AI factor. The method further comprises obtaining an alternative UX component containing additional information that meets the threshold of disclosure of the trustworthy AI factor and providing the alternative UX component for incorporation into the front-end UX of the application.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 5 is a flow diagram illustrating an example method for evaluating uncertainty quantification, in accordance with some embodiments of the present disclosure.

FIG. 11 is a flow diagram illustrating an example method for evaluating a front-end UX of an application for disclosure of a trustworthy AI factor, in accordance with some embodiments of the present disclosure.

Figure 1:
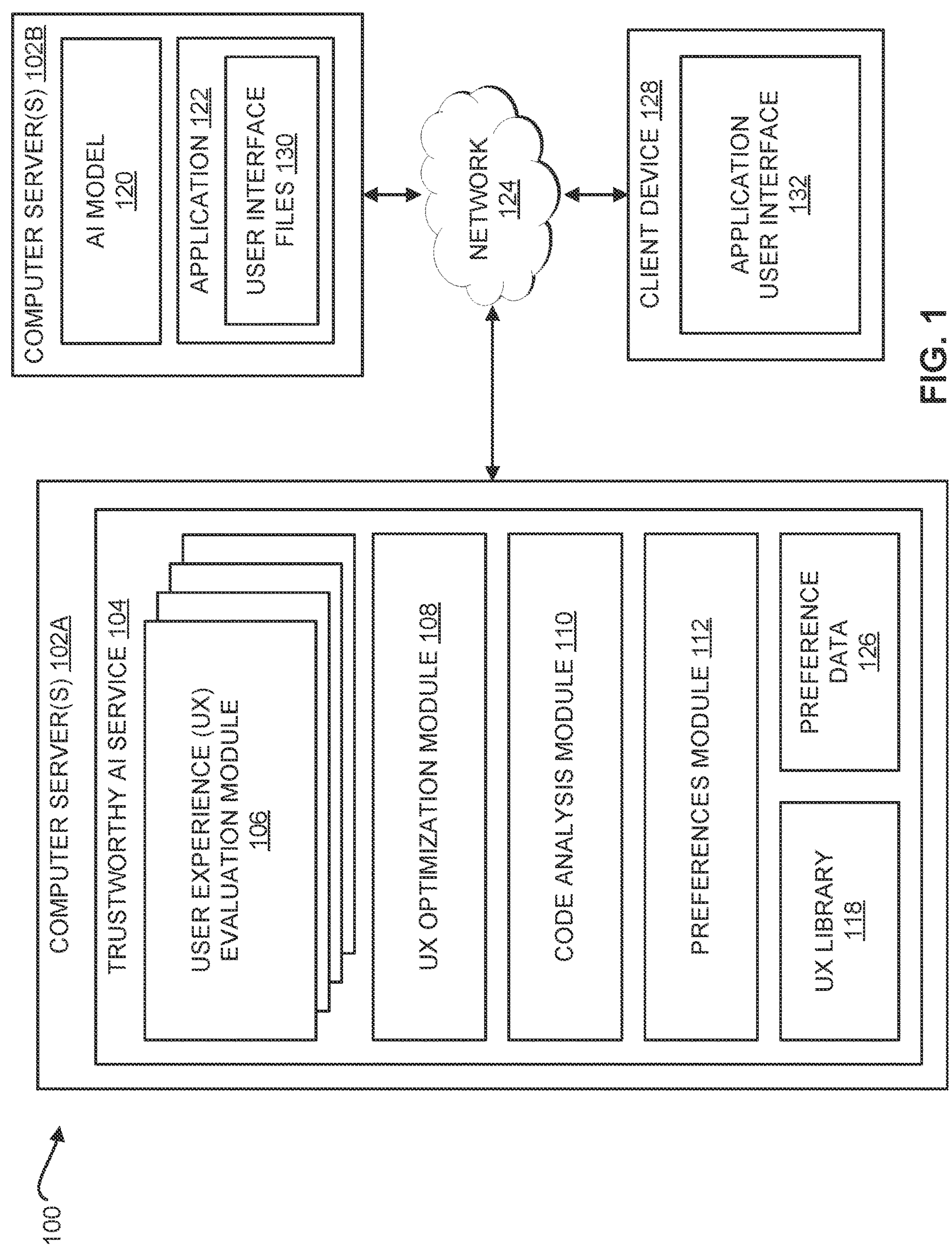
FIG. 1 is a block diagram illustrating an example computational environment implementing a trustworthy AI service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward evaluating a front-end user experience (UX) based on trustworthy artificial intelligence (AI) factors pertaining to a prediction output by an AI model, and modifying the front-end UX to improve the disclosure of the trustworthy AI factors pertaining to the prediction output. While not limited to such applications, embodiments of the present disclosure may be better understood in light of the aforementioned context.

As AI becomes more advanced, individuals are challenged to comprehend and retrace how an AI model generated a decision output. UX developers can help address this challenge by designing front-end UXs (e.g., user-experiences provided in a graphical user interface of an application) that provide explanations about how an AI model came to a decision. For example, explainable AI is a set of processes and methods that allows individuals to comprehend and trust the predictions output by machine learning algorithms. Explainable AI is used to describe an AI model, the AI model's expected impact and potential biases, and assists in characterizing AI model accuracy, fairness, transparency, and outcomes in decisions output by the AI model. UX developers can use explainable AI to instill trust and confidence in users by providing details about how an AI model came to a determination in a front-end UX. However, it is often the case that a front-end UX simply provides a prediction output by an AI model with no further explanation, or an explanation included in a front-end UX is not sufficient to promote user trust in a prediction output by an AI model.

Advantageously, aspects of the present disclosure overcome these challenges by evaluating a front-end UX for sufficient disclosure of trustworthy AI factors pertaining to a prediction output by an AI model and updating the front-end UX to optimize the disclosure of the trustworthy AI factors pertaining to the prediction output. More specifically, aspects of the present disclosure can identify individual UX components in a front-end UX that contain information conveying a trustworthy AI factor, such as accuracy, explainability, transparency, and fairness. Aspects of the present disclosure can then evaluate each UX component to determine a trust score for the UX component that indicates a degree to which the UX component conveys a respective trustworthy AI factor. In the case that a trust score for a UX component does not meet a threshold of disclosure for a respective trustworthy AI factor, aspects of the present disclosure can obtain an alternative UX component containing additional information that meets the threshold of disclosure of the trustworthy AI factor. Aspects of the present disclosure can then provide the alternative UX component for incorporation into the front-end UX in order to instill confidence in a user that the prediction generated by the AI model is trustworthy.

Referring now to the figures, FIG. 1 illustrates a block diagram of an example computational environment 100 that can implement a trustworthy AI service 104, in accordance with some embodiments of the present disclosure. As illustrated, the computational environment 100 can include one or more computers 102A hosting aspects of the trustworthy AI service 104.

In some embodiments, the trustworthy AI service 104 can be provided as a service to an application 122 that utilizes an AI model 120 to provide AI results (e.g., predictions, decisions, and other information) to users via an application user interface 132. The trustworthy AI service 104 can evaluate the user interface of the application 122 to determine whether a UX of the user interface explains a result output by the AI model 120 in view of one or more trustworthy AI factors, and augment the UX to optimize the explanation of the AI result in view of the trustworthy AI factors.

Figure 2:
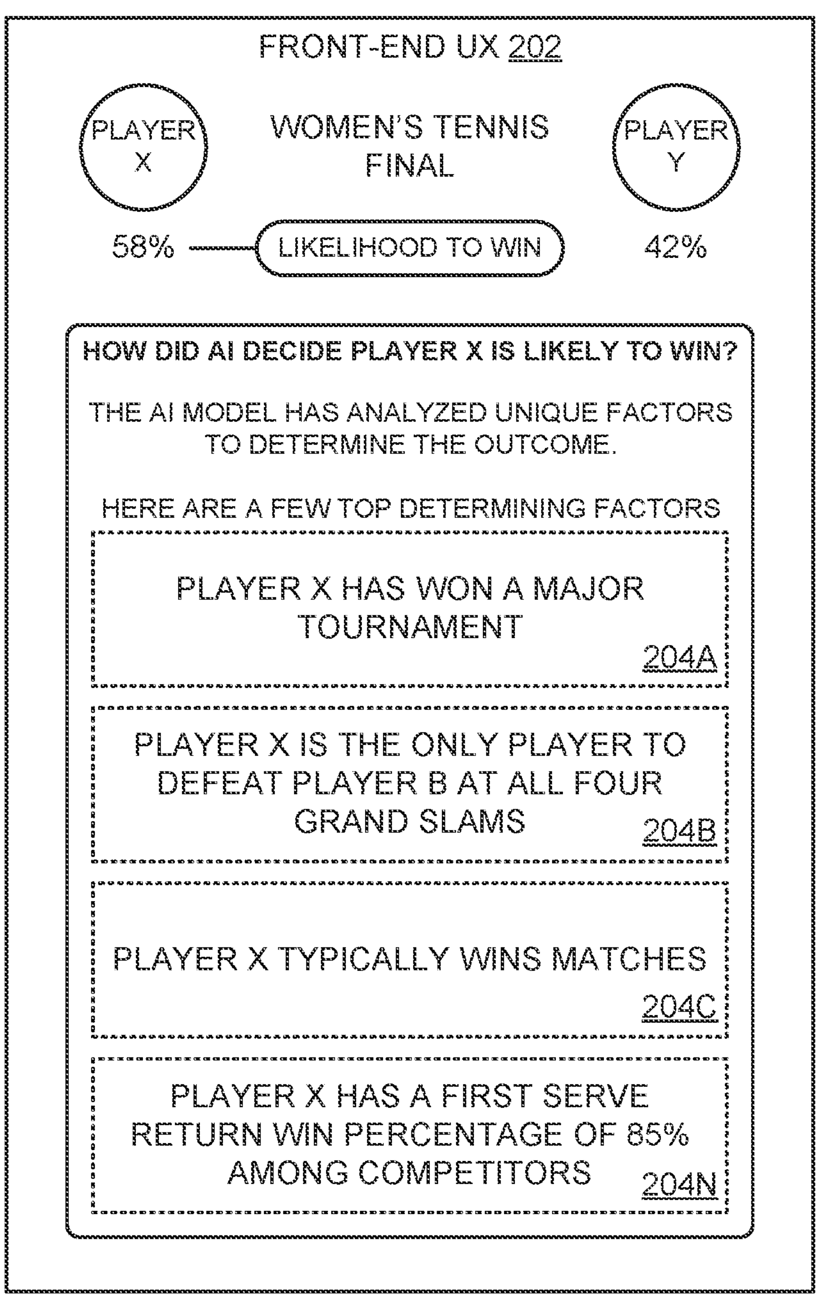
FIGS. 2 and 3 are diagrams illustrating example front-end UXs, in accordance with some embodiments of the present disclosure.

User experience (UX) refers to aspects of an end-user's interaction with an application 122 via the application's user interface 132. UX design is the process of creating evidence-based, interaction designs between human users and applications 122, including web applications, mobile applications, desktop applications, and the like. Unlike user interface design, which focuses on the design of a computer interface, UX design in the area of AI encompasses aspects of a user's perceived experience with an application 122 and an AI model 120 to provide an explanation of a result output by the AI model 120. For example, a UX designer can specify what information regarding a prediction output by an AI model 120 to include in an application user interface 132. These specifications can be coded into application files (e.g., scripts, functions, etc.) to display information explaining a result output by an AI model 120 in the application user interface 132. FIG. 2 illustrates a non-limiting example of a front-end UX 202 that includes UX components 204A, 204B, 204C, and 204N (where N can be any integer representing any number of UX components 204) containing information associated with a result output by an AI model. It will be appreciated that the front-end UX 202 shown in FIG. 2 is for illustrative purposes only and aspects of the present disclosure can be applied to any front-end UX for providing AI results to users.

Referring generally to FIGS. 1 and 2, the trustworthy AI service 104 can include a number of modules, including one or more UX evaluation modules 106 for individual trustworthy AI factors, as well as other modules described in more detail later. The UX evaluation module 106 performs an evaluation of a front-end UX 202 for an application 122 to determine whether or not, and/or to what degree, a UX component 204A-N describes how and why a result output by an AI model 120 was determined in view of a trustworthy AI factor, and assigns a trust score to the UX component 204A-N. Trustworthy AI, as used herein, refers to an evidence-based approach to demonstrate that output of an AI model can be trusted based on the factors of: accuracy of a result output by the AI model, explainability as to why the AI model output the result, transparency of how the AI model determined the result, and fairness of the AI model to generate an unbiased result.

In some embodiments, the trustworthy AI service 104 can include individually configured UX evaluation modules 106 for each trustworthy AI factor of interest. For example, the trustworthy AI service 104 can include a UX evaluation module 106 configured for each of an accuracy trustworthy AI factor, an explainability trustworthy AI factor, a transparency trustworthy AI factor, a fairness trustworthy AI factor, as well as other trustworthy AI factors not specifically described herein. In particular, the trustworthy AI service 104, in some embodiments, includes a UX evaluation module 106 configured for an accuracy trustworthy AI factor and analyzes a calibration of an AI model 120 based on a reliability score generated for the AI model 120 to determine the accuracy of the output of the AI model 120. Also, in some embodiments, the trustworthy AI service 104 includes a UX evaluation module 106 configured for a transparency trustworthy AI factor and evaluates a UX component 204A-N using predictor variables of an AI model 120 to determine a degree to which transparency of the AI model 120 is disclosed in the UX component 204A-N.

As part of performing an evaluation of a front-end UX 202 for an application 122, the UX evaluation module 106 obtains a user interface file(s) 130 for the application 122 that implements the front-end UX 202 and analyzes the user interface file 130 to identify a UX component 204A-N included in the front-end UX 202 containing information that conveys a trustworthy AI factor (e.g., accuracy, explainability, transparency, fairness, etc.). For example, the UX evaluation module 106 can analyze one or more user interface files 130 (which can include a screenshot of an application user interface 132) that implement a front-end UX 202 to identify a UX component 204A-N in the front-end UX 202 that contains information explaining a result output by the AI model 120 in light of the trustworthy AI factor. The UX evaluation module 106 can perform this process for each trustworthy AI factor of interest. In some cases, a UX component 204A-N can be associated with more than one trustworthy AI factor. Also, a front-end UX 202 can contain multiple UX components 204A-N that are associated with a particular trustworthy AI factor.

In some embodiments, the UX evaluation module 106 can use one or more machine learning techniques to identify a UX component 204A-N in a front-end UX 202 that has a confidence interval representation of information directed to a trustworthy AI factor (e.g., accuracy, explainability, transparency, fairness, etc.). As an example, described in more detail in association with FIG. 4, the UX evaluation module 106 can use a convolutional neural network (CNN) model trained to identify representations of a trustworthy AI factor, in combination with optical character recognition (OCR), word embedding, and a feedforward neural network (FNN), to identify a UX component 204A-N in a front-end UX 202 that represents the trustworthy AI factor.

In addition to identifying a UX component 204A-N that represents a trustworthy AI factor, the UX evaluation module 106 can determine a boundary of the UX component 204A-N (shown in dotted line) in the application user interface 132 so that, as described in detail later, when the UX component 204A-N is found to be inadequate, the trustworthy AI service 104 can augment, remove, or replace the UX component 204A-N, or the trustworthy AI service 104 can append additional trustworthy AI factor information to the UX component 204A-N.

After identifying a UX component 204A-N that represents a trustworthy AI factor, the UX evaluation module 106 assigns a trust score to the UX component 204A-N that indicates whether, and to what degree, the information in the UX component 204A-N describes how the AI model 120 determined the result in view of the trustworthy AI factor. For example, a trust score assigned to a UX component 204A-N identified as describing the fairness of an AI model 120 to output unbiased results can be assigned a fairness trust score that indicates that the information in the UX component 204A-N represents the fairness trustworthy AI factor, and indicates to what degree (e.g., whether a minimum threshold of disclosure is met) the UX component 204A-N describes the fairness of an AI model 120. The UX evaluation module 106 can assign a trust score to each UX component 204A-N in a front-end UX 202 that contains information related to a trustworthy AI factor. Also, as described earlier, the trustworthy AI service 104 can evaluate a front-end UX 202 based on a set of trustworthy AI factors (e.g., accuracy, explainability, transparency, and fairness) and assign a trust score for each trustworthy AI factor included in the set (e.g., accuracy trust score, explainability trust score, transparency trust score, and fairness trust score). A trust score for a particular trustworthy AI factor can be an aggregate of trust scores assigned to two or more UX components 204A-N that correspond to a common trustworthy AI factor (e.g., aggregation of trust scores assigned to a first and second UX component 204A-N that both contain information related to an explainability trustworthy AI factor).

The trustworthy AI service 104 can include a code analysis module 110 that analyzes the source code of an AI model 120 (when available) using word embedding to determine a semantic interpretation of terms found in comments and code embeddings in view of a trustworthy AI factor. A method used to perform the code analysis is described in more detail in association with FIG. 9. The code analysis module 110 can provide the UX evaluation module 106 with a confidence level (e.g., semantic trust score) of semantic interpretation of a term in the source code in relation to a trustworthy factor (e.g., fairness), and as part of determining a trust score for the trustworthy AI factor (e.g., fairness), the UX evaluation module 106 can use the semantic trust score assigned to the term to determine whether a UX component 204A-N in a front-end UX 202 containing the term is related to the trustworthy AI factor (e.g., fairness).

A trust score assigned to a UX component 204A-N can be a value (e.g., a value between zero and one) that is based on a confidence level that the UX component 204A-N represents an explanation of an AI result in view of a trustworthy AI factor. In some embodiments, a trust score for a UX component 204A-N can be a confidence level value output by a machine learning model (e.g., a CNN model and/or an FNN model) used to determine whether the UX component 204A-N represents a trustworthy AI factor. As described below, a trust score assigned to a UX component 204A-N can be used to determine whether to add, augment, or replace the UX component 204A-N in the application user interface 132, or whether to append information (e.g., additional or alternative UX component) to the UX component 204A-N.

In some embodiments, the trustworthy AI service 104 can generate an overall trust score for a front-end UX 202 using individual trust scores generated for a set of trustworthy AI factors. The overall trust score can indicate a degree to which a front-end UX 202 as a whole discloses the set of trustworthy AI factors. For example, an overall trust score for a front-end UX 202 can be calculated using individual trust scores for accuracy, explainability, transparency, fairness, and/or other trustworthy AI factors. In some embodiments, an overall trust score for a front-end UX 202 can be an average of individual trust scores for a set of trustworthy AI factors. In other embodiments, an overall trust score for a front-end UX 202 can be a median, mode, range, grade, or any other value or symbol that represents a score. Illustratively, an overall trust score can be calculated for a front-end UX 202 to provide an owner of an application 122 and/or an application developer a general indication of disclosure of AI trustworthiness in the front-end UX 202. For example, during development of an application 122, an IDE can be configured to request an overall trust score (e.g., via an application programming interface (API)) from the trustworthy AI service 104 to allow UX designers and application developers to access overall AI trustworthiness conveyed in a front-end UX 202.

As illustrated, the trustworthy AI service 104 includes a UX optimization module 108 configured to improve disclosure of AI trustworthiness in a front-end UX 202 when a determination is found that the front-end UX 202 does not include adequate information related to one or more trustworthy AI factors. In some embodiments, the UX optimization module 108 evaluates a trust score for a trustworthy AI factor in relation to a front-end UX 202 to determine whether the trust score meets a threshold of disclosure for the trustworthy AI factor. In some embodiments, a threshold value used to evaluate a trust score can be defined by a customer of the trustworthy AI service 104. For example, the customer can specify individual threshold values for individual trustworthy AI factors (e.g., 97% accuracy threshold, 85% explainability threshold, 75% transparency threshold, 95% fairness threshold, etc.). In some embodiments, a customer of the trustworthy AI service 104 can assign weights to the individual trustworthy AI factors (e.g., "High", "Medium", or "Low") that increase or decrease a threshold of disclosure for a trustworthy AI factor. In some embodiments, weights assigned to trustworthy AI factors can be determined over time by collecting data related to user-interaction with an application user interface 122 that implements a front-end UX 202 and analyzing the data to determine weights for the trustworthy AI factor based on the user-interaction. An amount and/or type of user interaction with a UX component 204A-N in a front-end UX 202 can indicate whether disclosure of a trustworthy AI factor in the UX component 204A-N is sufficient or not. Also, the amount and/or type of user interaction with the UX component 204A-N can indicate an importance of a trustworthy AI factor to a particular user. Thus, in some embodiments, a background process of an application 122 can collect user-interaction data, and the user-interaction data can be provided to the preferences module 112, which analyzes the user-interaction data to identify an amount and/or type of user interaction with the UX components 204A-N of a front-end UX 202 and determines weights for individual trustworthy AI factors based on the analysis. The preferences module 112 can store the weights as preference data 126, and the preference data 126 can be made accessible to the UX optimization module 108 to allow the UX optimization module 108 to apply the weights to trustworthy AI factors when evaluating trust scores for the trustworthy AI factors.

Figure 3:
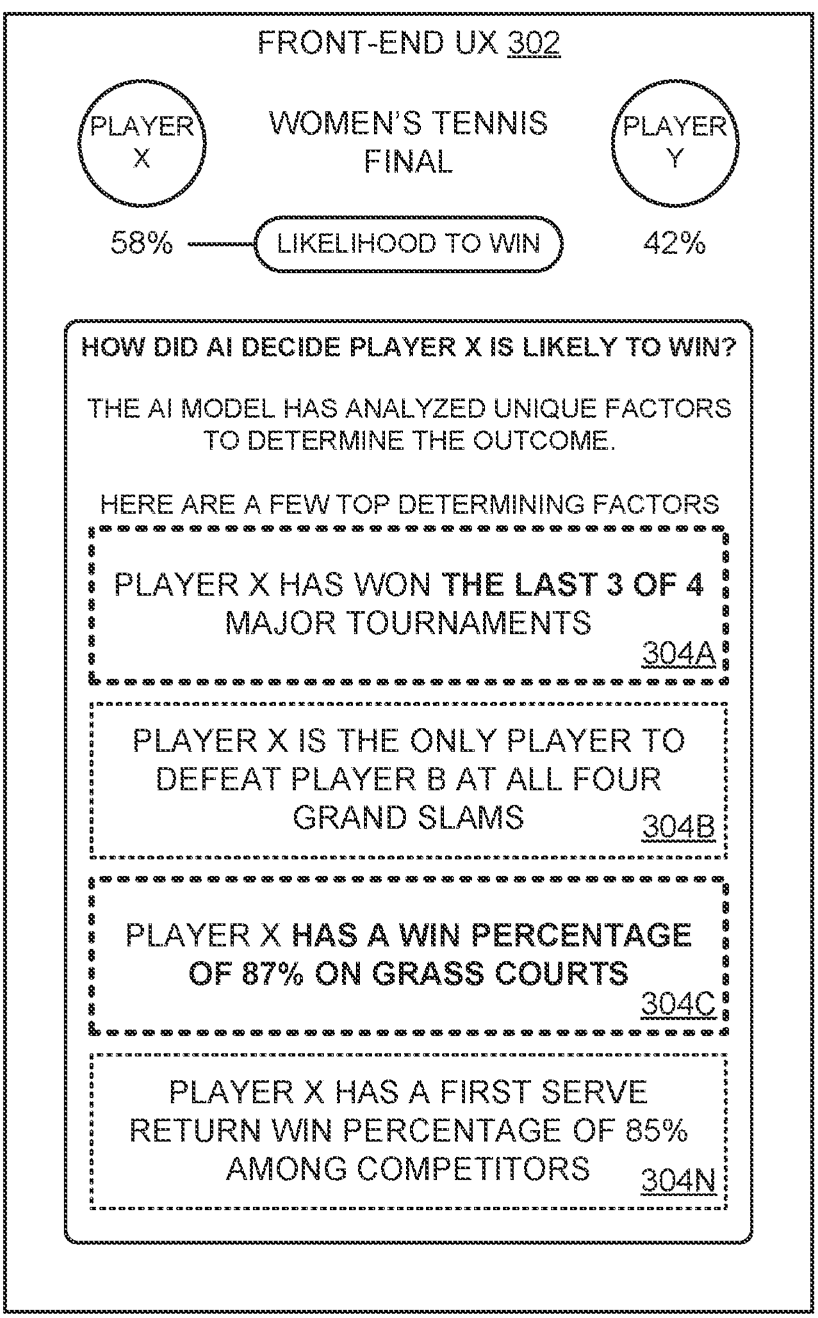

The UX optimization module 108 can improve the disclosure of a trustworthy AI factor in a front-end UX 202 when a trust score for the trustworthy AI factor does not meet a threshold. Referring generally to FIGS. 1, 2, and 3, in some embodiments, the UX optimization module 108 can modify a front-end UX 202 of an application user interface 132 to include an alternative UX component containing additional (or alternative) information that meets a threshold of disclosure of a trustworthy AI factor. The alternative UX component can expand, refine, append, or replace an original explanation of an AI result in view of the trustworthy AI factor. As a non-limiting example, an explanation in an original UX component (e.g., 204A) can be expanded to better explain an AI result in light of a trustworthy AI factor (e.g., 304A), where the bolded text illustrates an expanded description that is based on the original description in 204A. In another example, an alternative UX component (e.g., 304C) can replace an original UX component (e.g., 204C) in a front-end UX 302 to provide an alternative explanation that more clearly describes the result in view of the trustworthy AI factor as compared to the explanation in the original UX component (e.g., 204C), where the bolded text in 304C illustrates an improved explanation over the explanation in 204C.

As shown in FIG. 1, the trustworthy AI service 104 can include a UX library 118 of alternative UX components containing improved explanations of AI results for individual trustworthy AI factors. In some embodiments, the alternative UX components stored in the UX library 118 are generated by UX designers and uploaded to the UX library 118 for use by the trustworthy AI service 104. Metadata (e.g., tags) is generated and attached to a UX component to allow the UX component to be found in the UX library 118. The metadata can indicate a trustworthy AI factor that is associated with the UX component, allowing the UX optimization module 108 to obtain an alternative UX component for a particular trustworthy AI factor. The UX component can include updatable fields which the trustworthy AI service 104 can populate with information for a current result output by the AI model 120 (e.g., input variables, configuration variables, prediction variables, and other information used in determining the result). The UX optimization module 108 can obtain an alternative UX component associated with a trustworthy AI factor from the UX library 118 and incorporate the alternative UX component in a front-end UX 302 of an application user interface 132 for display on a client device 128.

Alternatively, in some embodiments, the UX optimization module 108 can generate an alternative UX component for a trustworthy factor that includes an improved explanation which meets a trust score threshold. The improved explanation can be based in part on an original explanation that does not meet the trust score threshold. In some embodiments, the UX optimization module 108 can use machine learning techniques and NLP to generate an improved explanation for an alternative UX component.

The UX optimization module 108 can incorporate an alternative UX component in a front-end UX 302 of an application user interface 132 by modifying an original UX component to include an improved explanation of an AI result, replacing the original UX component with the alternative UX component, or appending the alternative UX component to the original UX component. For example, as described earlier, the UX evaluation module 106 can determine a boundary of a UX component 204A-N (shown as a dashed line) in a front-end UX 202, and the UX optimization module 108 can use the boundary information to incorporate an alternative UX component into an application user interface 132 displayed on a client device 128. The UX optimization module 108 can use UX component boundary information to perform replacement and append operations. In cases where a front-end UX 202 does not include a description of a trustworthy AI factor, the UX optimization module 108 can add a UX component for the trustworthy AI factor to the front-end UX 202.

In some embodiments, the UX optimization module 108 optimizes a front-end UX 302 by performing a bin packing technique that selects a minimum number of UX components 304A-N (e.g., 304A, 304B, 304C, and 304N corresponding to 204A-N) to include in the front-end UX 302 while maximizing the overall trust score for the front-end UX 302. The bin packing technique, which is described in more detail in association with FIG. 10, evaluates the trust scores assigned to individual UX components 304A-N and determines which UX components 304A-N to include in a front-end UX 302 based the competing goals of maximizing an overall trust score for the front-end UX 302 and minimizing the number of UX components 304A-N included in the front-end UX 302.

Alternatively, or in addition, in some embodiments the UX optimization module 108 can suggest changes to a front-end UX 202 that improve a disclosure of a trustworthy AI factor in the front-end UX 202. That is, instead of directly incorporating alternative UX components into an application user interface 132, the UX optimization module 108 can provide suggested UX components to an application 122 or IDE to allow an application owner and/or application developer to accept or reject the suggested UX components. As one example, the UX optimization module 108 can generate an improved AI result description for a trustworthy AI factor and provide the description as a suggested UX component of a front-end UX 202.

In some embodiments, the modules described and discussed above can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

As shown in FIG. 1, a network 124 can be provided to enable communication between the components of the computational environment 100. The network 124 can include any useful computing network, including an intranet, the Internet, a local area network, a wide area network, a wireless data network, or any other such network or combination thereof. Components utilized for the network 124 may depend at least in part upon the type of network and/or environment selected. Communication over the network 124 may be enabled by wired or wireless connections and combinations thereof.

In some embodiments, an application programming interface (API) can provide a discoverable service endpoint for the trustworthy AI service 104, allowing the trustworthy AI service 104 to receive requests to evaluate a front-end UX for an application 122 and provide trust scores and alternative UX components in response to the requests. In some embodiments, an integrated development environment (IDE) in relation to development of applications that utilize AI models can send requests to the trustworthy AI service 104. In response to such requests, the trustworthy AI service 104 can evaluate a user interface of an application under development and provide an overall trust score for a front-end UX implemented in the user interface, and/or individual trust scores based on trustworthy AI factors included in the front-end UX. API calls, procedure calls, or other network commands that may be made in relation to the trustworthy AI service 104, as well as to the modules and/or services included in the trustworthy AI service 104, can be implemented according to different technologies, including, but not limited to, Representational state transfer (REST) technology or Simple Object Access Protocol (SOAP) technology.

While FIG. 1 illustrates an example of a computational environment that can implement the techniques above, many other similar or different environments are possible. The example environments discussed and illustrated above are merely representative and not limiting.

Figure 4:
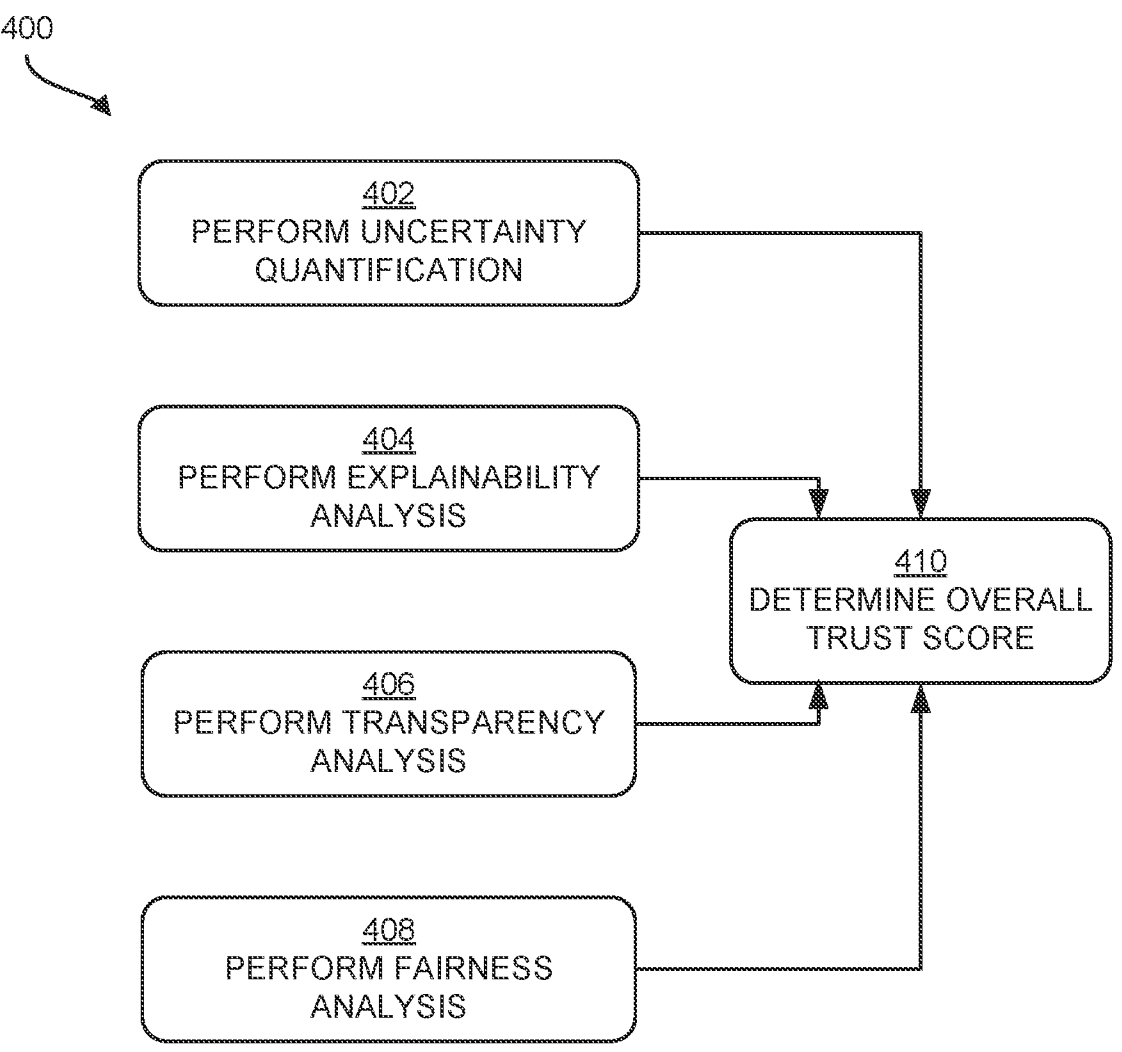
FIG. 4 is a flow diagram illustrating an example method for determining trust scores for individual trustworthy AI factors and determining an overall trust score for a front-end UX, in accordance with some embodiments of the present disclosure.

FIG. 4 is a flow diagram that illustrates an example method 400 for determining trust scores for individual trustworthy AI factors and determining an overall trust score for a front-end UX, in accordance with some embodiments of the present disclosure. As shown, the method 400 comprises a number of operations 402, 404, 406, and 408 for evaluating a front-end UX based on individual trustworthy AI factors, and an operation 410 for determining an overall trust score for the front-end UX based on individual trust scores for the individual trustworthy AI factors. As will be appreciated, the operations 402, 404, 406, and 408 that contribute to an overall trust score determination can be performed sequentially and/or in parallel.

Starting with operation 402, uncertainty quantification can be performed to determine an accuracy of results output by an AI model and shown in the front-end UX. The uncertainty quantification of the AI model can be performed by evaluating the front-end UX for a representation of AI accuracy and analyzing the calibration of the AI model to determine output accuracy. A trust score for accuracy trustworthiness can be calculated based on the uncertainty quantification.

As a non-limiting example, as shown in FIG. 5, an uncertainty quantification method can include operations 510 and 512 that evaluate the front-end UX using a CNN model trained to identify elements associated with an AI accuracy representation (e.g., a combination of terms associated with an accuracy of AI model output), and an operation 512 that extracts terms from the UX component associated with the representation of AI model accuracy and provide the extracted terms to operation 504 (described below). As a non-limiting example, the CNN can evaluate a front-end UX file (e.g., a screenshot, hypertext markup language (HTML) file, or another file) using OCR and word embedding to identify key words associated with a description of AI accuracy (UX component), and the UX component can be input to an FNN to obtain a probability (representation score) that the UX component is associated with AI accuracy. As part of identifying the UX component, operation 514 can determine the boundaries of the UX component in the front-end UX using an object detection technique (e.g., you only look once (YOLO) real time object detection) to enable modification or replacement of the UX component in the front-end UX, as described in association with FIG. 10.

The uncertainty quantification method can also include operations 502, 504, and 506 that determine a reliability score for the AI model. Namely, operation 502 can evaluate independent variable data for the AI model, operation 504 can measure a difference between domains, and operation 506 can perform a data range comparison. For example, the operations 502, 504, and 506 analyze a calibration of the AI model, which comprises creating calibration plots and measuring the calibration plots to determine a reliability score. Creating a calibration plot is a common technique for checking an AI model's calibration, which is an indication of output accuracy of the AI model. Such calibration plots show any potential mismatch between the probabilities predicted by the AI model, and the probabilities observed in the output data. Illustratively, a calibration plot for a perfectly calibrated AI model is a straight line corresponding to an identity function, where estimated probabilities are the same as actual outcomes. As the calibration of an AI model improves, the plot curve becomes a straight line. The difference between the domains of independent variables can be measured (e.g., the domains can be represented by DBpedia using SPARKQL queries) to determine a reliability score for the AI model. The reliability score can be combined with the representation score obtained via operation 510 to provide a trust score for the accuracy trustworthy AI factor.

Referring again to FIG. 4, operation 404 performs explainability analysis that determines whether the front-end UX includes an easy-to-understand explanation that is within natural language (e.g., an understandable sentence about the prediction) of how and why the AI model generated the prediction. The explanation can be evaluated using natural language processing (NLP) to determine whether the explanation includes a stance, such as a justification (e.g., pro or con), and whether the explanation has a low complexity match to meet a mental model of a user.

Figure 6:
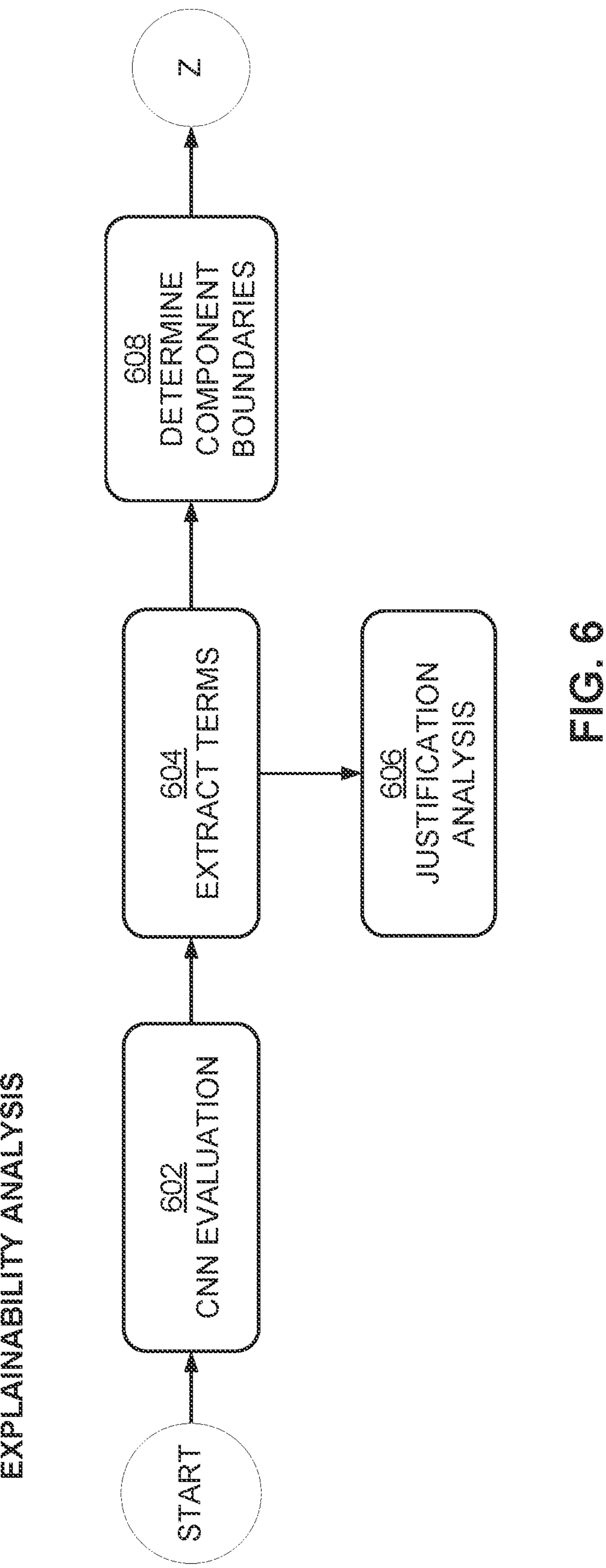
FIG. 6 is a flow diagram illustrating an example method for performing explainability analysis, in accordance with some embodiments of the present disclosure.

As a non-limiting example, as shown in FIG. 6, an explainability analysis method can includes operations 602 and 604 that evaluate the front-end UX using a CNN model trained to identify elements associated with AI explainability in the front-end UX and extract terms from a UX component identified by the CNN model. The extracted terms can be provided to operation 606, which performs justification analysis. The justification analysis determines whether an explanation of an AI prediction provides one or more justifications (e.g., pros or cons) for the AI prediction. For example, in a case where an AI prediction indicates a winner of a tennis match, the justification analysis can search for terms that explain why the player is predicted to win the match (e.g., "player won last 3 of 4 tournaments", "player defeated opponent in past Grand Slams", "player has a win percentage of 87% on grass courts", and the like). In some embodiments, the justification analysis can be performed using a BERT (Broad Bidirectional Encoder Representations from Transformers) model configured to use NLP and machine learning to determine whether terms in the front-end UX are justifications for a prediction generated by the AI model. The justification analysis can generate a justification score, which can be combined with a representation score obtained via operation 602 to provide a trust score for the explainability trustworthy AI factor. As part of identifying the UX component, operation 608 can determine the boundaries of the UX component in the front-end UX using an object detection technique (e.g., YOLO real time object detection) to enable modification or replacement of the UX component in the front-end UX, as described in association with FIG. 10.

Referring again to FIG. 4, operation 406 performs transparency analysis that determines whether the front-end UX provides an explanation about how the inner workings of the AI model work to generate a result. In some embodiments, the transparency analysis can include evaluating the front-end UX for transparency tabulations that are numerically based and related to the predictor variables or fields used by the AI model.

Figure 7:
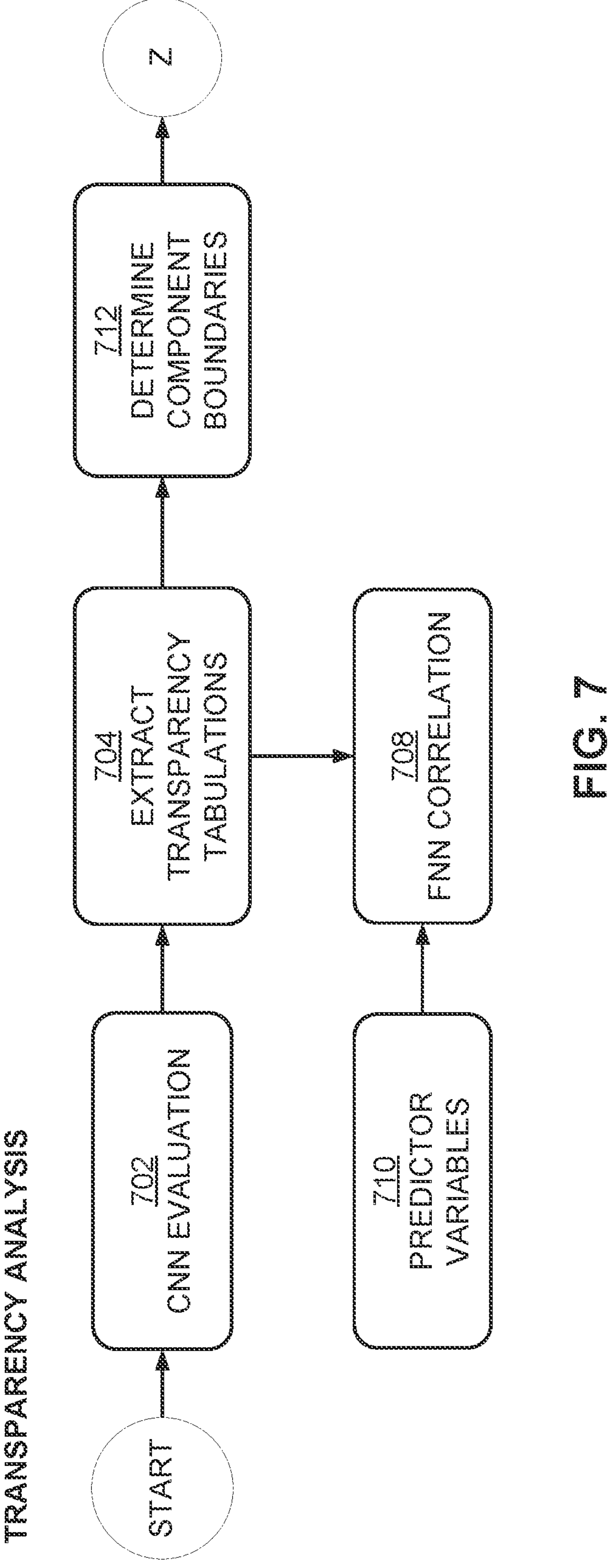
FIG. 7 is a flow diagram illustrating an example method for performing transparency analysis, in accordance with some embodiments of the present disclosure.

As a non-limiting example, as shown in FIG. 7, a transparency analysis method can include operations 702 and 704 that evaluate the front-end UX using a CNN model trained to identify elements associated with AI transparency in the front-end UX and extract an identified transparency tabulation (UX component) from the front-end UX file. The transparency tabulation should be numerically based and related to the predictor variables. Operation 710 can obtain predictor variables used by the AI model to generate a prediction. The predictor variables and the UX component (extracted transparency tabulation) can be input to an FNN-LSTM (long short-term memory) model to obtain a probability (representation score) for the UX component. In cases where the predictor variables are not available (e.g., a customer hasn't provided access to the predictor variable), operation 708 can generate a probability using other elements associated with AI transparency extracted from the front-end UX. As part of identifying the UX component, operation 712 can determine the boundaries of the UX component in the front-end UX using an object detection technique (e.g., YOLO real time object detection) to enable modification or replacement of the UX component in the front-end UX, as described in association with FIG. 10.

Figure 8:
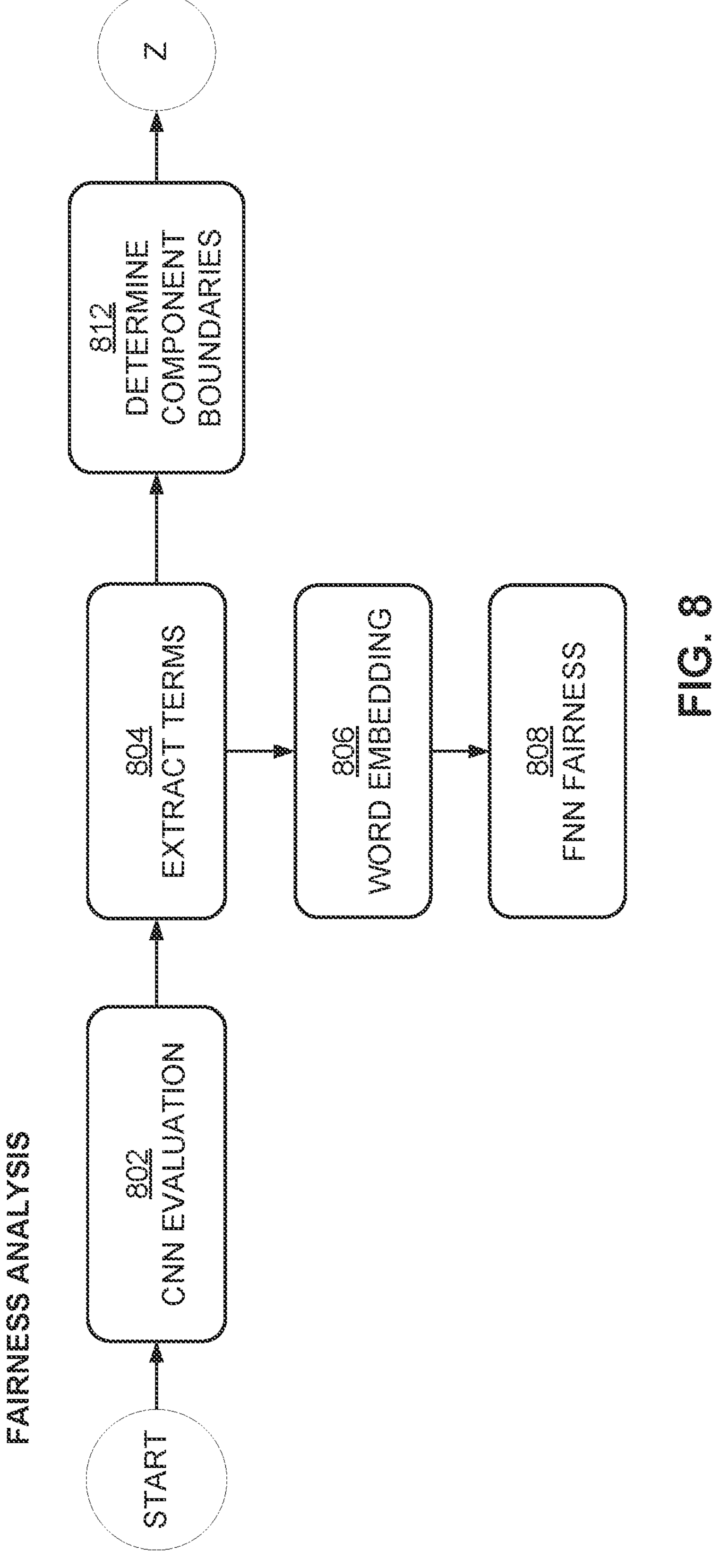
FIG. 8 is a flow diagram illustrating an example method for performing fairness analysis, in accordance with some embodiments of the present disclosure.

Again, referring to FIG. 4, operation 408 performs fairness analysis to determine whether the front-end UX includes an explanation of fairness of the AI model to generate an unbiased result. As a non-limiting example, as shown in FIG. 8, a fairness analysis method can include an operation 802 to evaluate the front-end UX using a CNN model trained to identify elements associated with AI fairness in the front-end UX, an operation 804 to extract terms from an identified UX component associated with AI model fairness, an operation 806 to perform word embedding analysis of the extracted terms, and an operation 808 to input the data from operations 802, 804, and 806 to an FNN to obtain a probability (representation score) for the UX component. As part of identifying the UX component, operation 812 can determine the boundaries of the UX component in the front-end UX using an object detection technique (e.g., YOLO real time object detection) to enable modification or replacement of the UX component in the front-end UX, as described in association with FIG. 10.

Returning to FIG. 4, operation 410 determines an overall trust score for the front-end UX that is based, at least in part, on the trust scores for individual trustworthy AI factors determined by operations 402, 404, 406, and 408. The overall trust score can indicate a degree to which the front-end UX as a whole discloses the trustworthy AI factors. The overall trust score can be an average, median, mode, range, grade, or any other value or symbol that represents an overall score based on the individual trust scores determined by operations 402, 404, 406, and 408.

In some embodiments, the method 400 can include an operation (not shown) that analyzes the source code of the AI model to determine a semantic trust score, which provides a confidence level for semantic interpretation of terms in the front-end UX that relate to one or more of the trustworthy AI factors. Thus, in cases where the source code of the AI model is accessible to the trustworthy AI service, a word embedding model that outputs a confidence level of semantic interpretation can be used by each operation 402, 404, 406, and 408 to determine semantic interpretation of terms in view of a particular trustworthy AI factor (e.g., accuracy, transparency, explainability, fairness, and the like).

Figure 9:
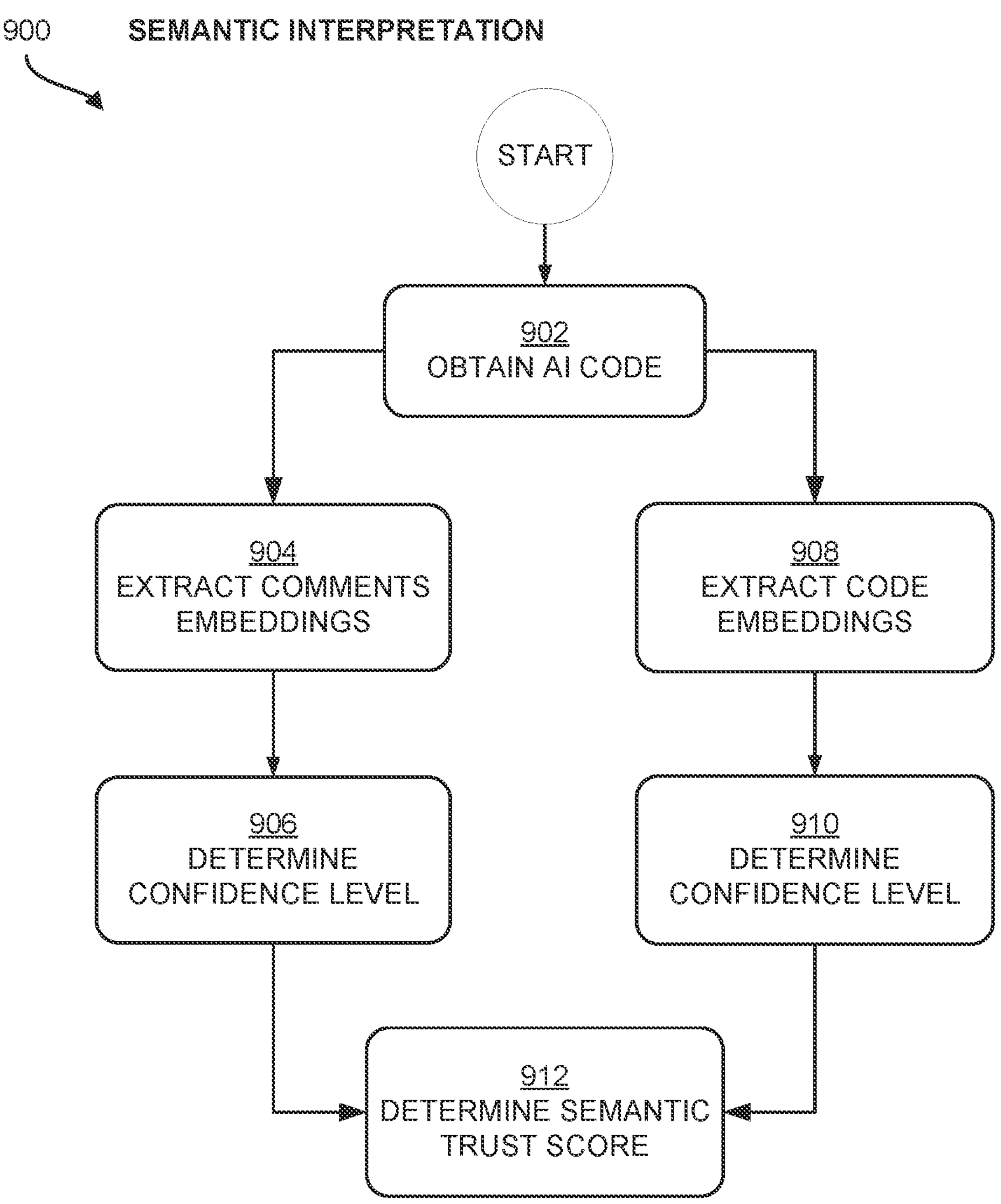
FIG. 9 is a flow diagram illustrating an example method for performing semantic interpretation of terms in a front-end UX in view of trustworthy AI factors, in accordance with some embodiments of the present disclosure.

As an example, referring to FIG. 9, a method 900 of semantic interpretation can provide a word embedding model for each trustworthy AI factor being considered as part of an overall trust score. As illustrated, operation 902 can obtain source code for an AI model (e.g., from a source code repository) and provide the source code to operation 904, which extracts comments embedded in the source code. The comments can be programmer-readable explanations or annotations in the source code, which can be added to the source code with the purpose of making the source code easier for programmers (and others) to understand, and which are generally ignored by compilers and interpreters. Operation 906 inputs the comments (e.g., terms) to a word embedding model configured for a particular trustworthy AI factor, and the word embedding model outputs a confidence level (e.g., confidence interval) indicating whether the comments are semantically related to the trustworthy AI factor. Operation 902 also provides the source code to operation 908, which extracts code embeddings from the source code. The code embeddings can comprise code snippets or code segments in the source code containing trustworthy AI related terms. The code embeddings are provided to operation 910, which inputs the code embeddings to a word embedding model configured for a particular trustworthy AI factor, and the word embedding model outputs a confidence level (e.g., confidence interval) that the code embeddings are semantically related to the trustworthy AI factor. Operation 912 evaluates the confidence levels (e.g., confidence intervals) output by operations 906 and 910 to determine a semantic trust score for the terms associated with the particular trustworthy AI factor. The semantic trust score can then be used to evaluate semantic interpretation of terms in the front-end UX in view of the trustworthy AI factor.

As specific trustworthy AI factor examples, for AI accuracy, the method 900 can focus on epistemic uncertainty of a term. For example, within human language, words such as "sure" and "confident" are indicative of uncertainty. Variables, methods, and/or comments extracted from source code can be input to the word embeddings model to determine a confidence level that the variables, methods, and/or comments are associated with the accuracy trustworthy AI factor. For AI explainability, the method 900 can use a word embedding model configured for common simple explanation code and comment vocabulary, and output a confidence level (e.g., confidence interval) for a semantic interpretation for explainability. For AI transparency, the method 900 can use a word embedding model for common transparent code and comment vocabulary, and output a confidence level (e.g., confidence interval) for a semantic interpretation for transparency. For AI fairness, the method 900 can use a word embedding model for common fairness code and comment vocabulary, and output a confidence level (e.g., confidence interval) for a semantic interpretation of fairness.

Figure 10:
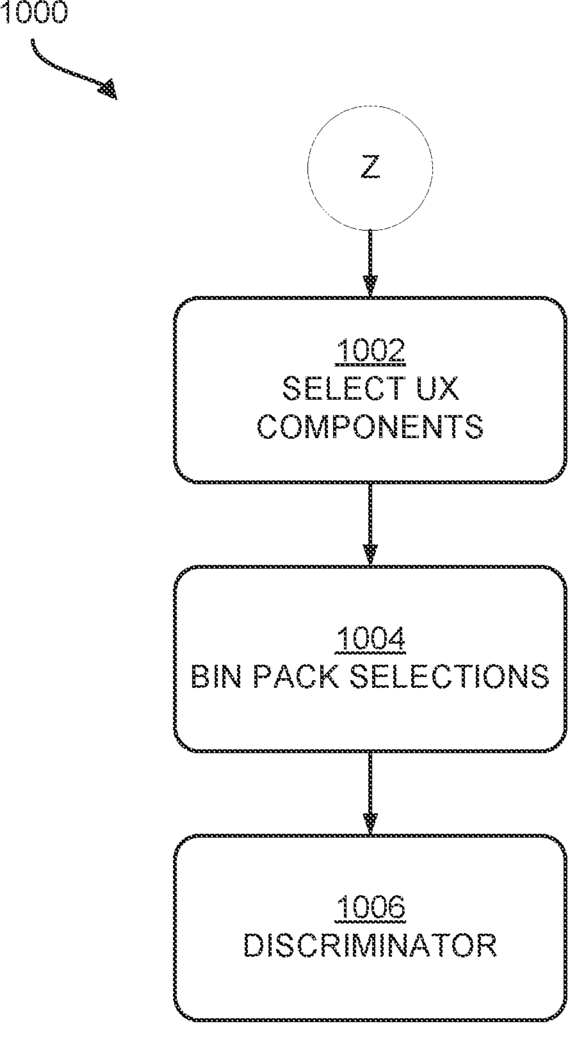
FIG. 10 is a flow diagram illustrating an example method for optimizing disclosure of trustworthy AI factors in a front-end UX, in accordance with some embodiments of the present disclosure.

FIG. 10 is a flow diagram illustrating an example method 1000 for optimizing disclosure of trustworthy AI factors in a front-end UX. As described earlier, after determining trust scores for a set of trustworthy AI factors, the method 1000 can be used to select alternative UX components for individual trustworthy AI factors that are not adequately disclosed in the front-end UX based on respective trust scores, and the method 1000 can incorporate the UX components in the front-end UX. The method 1000 can use a generative adversarial network (GAN) to minimize the number of UX components included in the front-end UX while maximizing the overall trust score for the front-end. The alternative front-end UXs can be created and evaluated to determine which combination of alternative front-end UXs minimizes the number of UX components included in the front-end UX, while maximizing the overall trust score of the front-end UX. As illustrated in FIG. 10, operation 1002 selects one or more alternative UX components associated with a trustworthy AI factor, which can be selected from a UX library (e.g., the UX library 118 described in association with FIG. 1), and/or generated by the trustworthy AI service 104 described in association with FIG. 1. Operation 1004 performs a bin packing technique to determine which UX components are selected for inclusion in the front-end UX (e.g., embeds UX components into a user interface as iframe elements), and operation 1006 evaluates the resulting front-end UX using a discriminator to determine a level of AI trustworthiness provided by the front-end UX. The method 1000 can be repeated to identify a front-end UX that maximizes AI trustworthiness using a minimum number of UX components.

FIG. 11 is a flow diagram that illustrates an example method 1100 for evaluating a front-end UX of an application for disclosure of a trustworthy AI factor, in accordance with some embodiments of the present disclosure. In operation 1102, the method 1100 identifies a UX component containing information that conveys a trustworthy AI factor, where the UX component is part of a front-end UX of an application that utilizes the AI model, and the information is related to an output of the AI model. The trustworthy AI factor measures an aspect of trust in the output of the AI model, such as, but not limited to accuracy, explainability, transparency, or fairness.

In some embodiments, identifying the UX component containing the information that conveys the trustworthy AI factor further includes analyzing the front-end UX of the application using one or more machine learning techniques to identify the UX component which has a confidence interval representation of the trustworthy AI factor. For example, various neural network models can be trained to identify representations of a trustworthy AI factor in the front-end UX.

In operation 1104, the method 1100 evaluates the information contained in the UX component to determine a trust score for the UX component that indicates a degree to which the information conveys the trustworthy AI factor. In the example where the trustworthy AI factor is the accuracy of results output by the AI model, the method 1100 can analyze a calibration of the AI model based on a reliability score generated for the AI model to determine an accuracy of the output of the AI model. In the example where the trustworthy score is transparency of how the AI model determines results, the method 1100 can evaluate the UX component using predictor variables of the AI model to determine a degree to which transparency of the AI model is disclosed in the UX component. In some examples, as described earlier in association with FIG. 9, the method 1100 analyzes the source code of the AI model to determine a semantic trust score that provides a confidence level for semantic interpretation of the terms contained in the UX component.

In operation 1106, the method 1100 determines, based on the trust score for the UX component, that the information contained in the UX component does not meet a threshold of disclosure of the trustworthy AI factor. In response, operation 1108 obtains an alternative UX component containing additional information that meets the threshold of disclosure of the trustworthy AI factor, and operation 1110 provides the alternative UX component for incorporation into the front-end UX of the application.

In some embodiments, the method 1100 can be performed for a set of trustworthy AI factors (e.g., accuracy, explainability, transparency, fairness, etc.). A trust score can be determined for each trustworthy AI factor in the set, and the method 1100 can generate an overall trust score to indicate a degree to which the information in the front-end UX as a whole discloses the set of trustworthy AI factors. In some embodiments, the method 1100 performs a bin packing technique to increase the overall trust score of the information in the front-end UX to disclose the plurality of trustworthy AI factors and to decrease a number of UX components included in the front-end UX. In some embodiments, weights can be assigned to alternative UX components based at least in part on user-preferences, and the weights can be considered when performing the bin packing technique.

Figure 12:
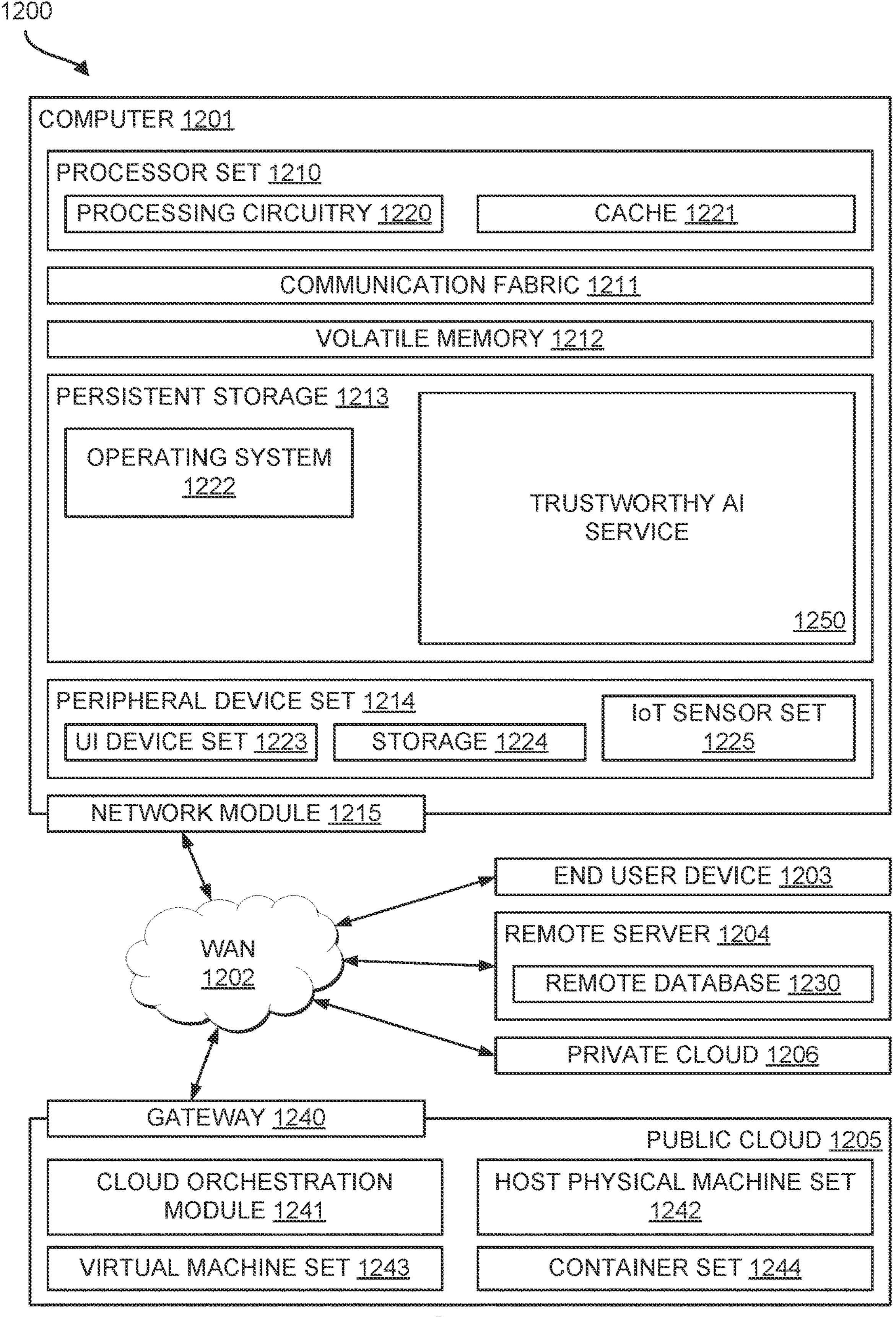
FIG. 12 is a block diagram that illustrates an example computing environment in which aspects of the present disclosure can be implemented, in accordance with some embodiments of the present disclosure.

The methods described above in association with FIGS. 4-11 can be performed by a computer (e.g., computer 1201 in FIG. 12), performed in a cloud environment (e.g., clouds 1206 or 1205 in FIG. 12), and/or can generally be implemented in fixed-functionality hardware, configurable logic, logic instructions, etc., or any combination thereof. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as a trustworthy AI service shown in block 1250 which evaluates a front-end UX of an application for disclosure of one or more trustworthy AI factors and modifies the front-end UX to improve disclosure of the one or more trustworthy AI factors. In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The computer readable program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction paths that allow the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory can be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a WI-FI network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:

identifying a user experience (UX) component containing information that conveys a trustworthy artificial intelligence (AI) factor, wherein the UX component is part of a front-end UX of an application that utilizes an AI model, and the information is related to an output of the AI model, and the trustworthy AI factor measures an aspect of trust in the output of the AI model;

evaluating the information contained in the UX component to determine a trust score for the UX component that indicates a degree to which the information contained in the UX component conveys the trustworthy AI factor;

determining based on the trust score for the UX component that the information contained in the UX component does not meet a threshold of disclosure of the trustworthy AI factor;

obtaining an alternative UX component containing additional information that meets the threshold of disclosure of the trustworthy AI factor; and providing the alternative UX component for incorporation into the front-end UX of the application.

2. The computer-implemented method of claim 1, wherein identifying the UX component containing the information that conveys the trustworthy AI factor further comprises analyzing the front-end UX of the application using one or more machine learning techniques to identify the UX component which has a confidence interval representation of the trustworthy AI factor.

3. The computer-implemented method of claim 1, wherein the trustworthy AI factor is an accuracy trustworthy AI factor and evaluating the UX component further comprises analyzing a calibration of the AI model based on a reliability score generated for the AI model to determine an accuracy of the output of the AI model.

4. The computer-implemented method of claim 1, wherein the trustworthy AI factor is a transparency trustworthy AI factor and evaluating the UX component further comprises using predictor variables of the AI model to determine a degree to which transparency of the AI model is disclosed in the UX component.

5. The computer-implemented method of claim 1, further comprising analyzing source code of the AI model to determine a semantic trust score that provides a confidence level for semantic interpretation of terms in the UX component.

6. The computer-implemented method of claim 1, further comprising:

performing the steps of identifying the UX component and evaluating the information contained in the UX component for each of a plurality of trustworthy AI factors selected from a group consisting of: accuracy, explainability, transparency, and fairness; and generating an overall trust score to indicate a degree to which the information in the front-end UX discloses the plurality of trustworthy AI factors.

7. The computer-implemented method of claim 6, further comprising:

performing a bin packing technique to increase the overall trust score of the information in the front-end UX to disclose the plurality of trustworthy AI factors and to decrease a number of UX components included in the front-end UX.

8. The computer-implemented method of claim 7, further comprising:

assigning weights to alternative UX components based at least in part on user-preferences, wherein the weights are considered when performing the bin packing technique.

9. The computer-implemented method of claim 1, further comprising:

receiving, at a discoverable service endpoint, a request to determine the trust score for the UX component; and providing the trust score for the UX component in response to the request.

10. The computer-implemented method of claim 9, wherein the request to determine the trust score for the UX component is generated within an integrated development environment (IDE) in relation to development of the application that utilizes the AI model.

11. A system, comprising:

one or more computer readable storage media storing program instructions and one or more processors which, in response to executing the program instructions, are configured to:

identify user experience (UX) components containing information, which is related to an output of an artificial intelligence (AI) model, that conveys one of a plurality of trustworthy AI factors, wherein the UX components are part of a front-end UX of an application that utilizes the AI model, and wherein the plurality of trustworthy AI factors measure different aspects of trust in the output by the AI model;

evaluate each of the UX components to determine trust scores for the UX components, wherein the trust scores indicate a degree to which the information contained in a UX component conveys a respective trustworthy AI factor;

determine based on a trust score for a UX component included in the UX components being evaluated that information contained in the UX component does not meet a threshold of disclosure of a trustworthy AI factor;

obtain an alternative UX component containing additional information that meets the threshold of disclosure of the trustworthy AI factor; and provide the alternative UX component for incorporation into the front-end UX of the application.

12. The system of claim 11, wherein the program instructions configured to cause the one or more processors to identify the UX component further cause the one or more processors to:

analyze the front-end UX of the application using one or more machine learning techniques to identify the UX component as having a confidence interval representation of the trustworthy AI factor.

13. The system of claim 11, wherein the program instructions are further configured to cause the one or more processors to:

analyze a calibration of the AI model based on a reliability score generated for the AI model to determine an accuracy of the output of the AI model.

14. The system of claim 11, wherein the program instructions are further configured to cause the one or more processors to:

obtain predictor variables of the AI model; and evaluate the UX component using the predictor variables of the AI model to determine a degree to which transparency of the AI model is disclosed in the UX component.

15. The system of claim 11, wherein the program instructions are further configured to cause the one or more processors to:

generate an overall trust score to indicate a degree to which the information in the front-end UX discloses the plurality of trustworthy AI factors; and performing a bin packing technique to increase the overall trust score of the information in the front-end UX to disclose the plurality of trustworthy AI factors and to decrease a number of UX components included in the front-end UX.

16. A computer program product, comprising:

one or more computer readable storage media, and program instructions collectively stored on the one or more computer readable storage media, the program instructions configured to cause one or more processors to:

identify user experience (UX) components containing information, which is related to an output of an artificial intelligence (AI) model, that conveys one of a plurality of trustworthy AI factors, wherein the UX components are part of a front-end UX of an application that utilizes the AI model, and wherein the plurality of trustworthy AI factors measure different aspects of trust in the output of the AI model;

evaluate each of the UX components to determine trust scores for the UX components, wherein the trust scores indicate a degree to which the information contained in a UX component conveys a respective trustworthy AI factor;

determine based on a trust score for a UX component included in the UX components being evaluated that information contained in the UX component does not meet a threshold of disclosure of a trustworthy AI factor;

obtain an alternative UX component containing additional information that meets the threshold of disclosure of the trustworthy AI factor; and provide the alternative UX component for incorporation into the front-end UX of the application.

17. The computer program product of claim 16, wherein the program instructions configured to cause the one or more processors to identify the UX component further cause the one or more processors to:

analyze the front-end UX of the application using one or more machine learning techniques to identify the UX component as having a confidence interval representation of the trustworthy AI factor.

18. The computer program product of claim 16, wherein the program instructions are further configured to cause the one or more processors to:

analyze a calibration of the AI model based on a reliability score generated for the AI model to determine an accuracy of the output of the AI model.

19. The computer program product of claim 16, wherein the program instructions are further configured to cause the one or more processors to:

obtain predictor variables of the AI model; and evaluate the UX component using the predictor variables of the AI model to determine a degree to which transparency of the AI model is disclosed in the UX component.

20. The computer program product of claim 16, wherein the program instructions are further configured to cause the one or more processors to:

generate an overall trust score to indicate a degree to which the information in the front-end UX discloses the plurality of trustworthy AI factors; and performing a bin packing technique to increase the overall trust score of the information in the front-end UX to disclose the plurality of trustworthy AI factors and to decrease a number of UX components included in the front-end UX.

* * * * *